United States Patent [19]

Umehara

[11] Patent Number: 4,707,431
[45] Date of Patent: Nov. 17, 1987

[54] OPTICAL INFORMATION RECORDING MEDIUM

[75] Inventor: Masaakira Umehara, Yokohama, Japan

[73] Assignee: Ricoh Co., Ltd., Tokyo, Japan

[21] Appl. No.: 791,384

[22] Filed: Oct. 25, 1985

[30] Foreign Application Priority Data

Nov. 1, 1984 [JP] Japan .................................. 59-228870

[51] Int. Cl.$^4$ .......................... G03C 1/72; G03C 1/76
[52] U.S. Cl. ................................. 430/271; 430/945;
430/917; 430/918; 522/27; 522/26; 522/24;
522/10; 522/14; 522/16; 522/20; 522/21;
346/76 L; 346/135.1; 369/283; 369/284;
369/94; 428/64; 428/25; 264/22
[58] Field of Search .............. 430/271, 945, 917, 918;
346/76 L, 135.1; 264/22; 369/283, 284, 94;
428/64, 65; 522/27, 26, 24, 10, 14, 16, 20, 21

[56] References Cited

U.S. PATENT DOCUMENTS

| | | | |
|---|---|---|---|
| 2,993,789 | 7/1961 | Crawford | 430/917 X |
| 3,450,612 | 6/1969 | Rudolph et al. | 522/27 X |
| 3,525,615 | 8/1970 | Chambers, Jr. | 430/917 X |
| 3,782,951 | 1/1974 | Lee | 522/26 X |
| 3,814,702 | 6/1974 | Bourdon et al. | 522/20 X |
| 3,864,133 | 2/1975 | Hisamatsu et al. | 430/917 X |
| 3,969,206 | 7/1976 | Roskott et al. | 522/21 X |
| 4,092,173 | 5/1978 | Novak et al. | 430/66 X |
| 4,171,979 | 10/1979 | Novak et al. | 430/449 |
| 4,325,794 | 4/1982 | Hunter et al. | 522/26 X |
| 4,364,986 | 12/1982 | Zwanenburg et al. | 430/945 X |
| 4,415,621 | 11/1983 | Specht et al. | 430/945 X |
| 4,527,173 | 7/1985 | Gupta et al. | 346/135.1 |
| 4,605,607 | 8/1986 | Nikles et al. | 430/945 X |

FOREIGN PATENT DOCUMENTS

| | | | |
|---|---|---|---|
| 81-02236 | 8/1981 | PCT Int'l Appl. | 264/22 |
| 942158 | 11/1963 | United Kingdom | 522/21 |
| 2070634 | 9/1981 | United Kingdom | 522/21 |

OTHER PUBLICATIONS

Leslie R. Gatechair et al., "Photoinitiators: An Overview of Mechanisms and Applications", *Journal of Radiation Curing*, Jul. 1983, pp. 4–18.

C. G. Roffey, "Chapter 3: Photoinitiators and Photo-Sensitizers", *Photopolymerization of Surface Coatings*, John Wiley & Sons, Ltd., New York, N.Y., 1982, pp. 67–136.

Jaromir Kosar, *Light-Sensitive Systems:Chemistry and Application of Nonsilver Halide Photographic Processes*, John Wiley & Sons, Inc., New York, N.Y., 1965, pp. 158–193.

Primary Examiner—John E. Kittle
Assistant Examiner—Cynthia Hamilton
Attorney, Agent, or Firm—Oblon, Fisher, Spivak, McClelland, & Maier

[57] ABSTRACT

This invention relates to an optical information recording medium comprising a substrate provided at least with an underlayer and a recording layer thereon, said underlayer being prepared by curing a light-curable composition containing a reducing agent, a photopolymerization initiator and acrylate monomer and/or methacrylate monomer and/or their corresponding oligomer.

2 Claims, 3 Drawing Figures

OPTICAL INFORMATION RECORDING MEDIUM

BACKGROUND OF THE INVENTION (a) Field of the Invention

This invention relates to an optical information recording medium comprising a substrate having a cured under-layer of a light curable resin thereon.

(b) Description of the Prior Art

Hetetofore, there are known injection process and photo-polymerization process (Philips Tech. Rev., Vol. 40, pp. 298–309, 1982) as a process for forming a concavo-convex pattern information track on a substrate. However, a light memory disk prepared by the injection process causes much noise because reflected light varies due to double refraction. Furthermore, since this memory disk has poor resistance to solvent, there is possibility that a pre-groove is lost when a reflective layer, recording layer, protective layer and the like are formed on the information track by wet coating process. Still furthermore, when making use of metallic light reflection by coloring matter as a recording material, various performances of focusing, tracking, regenerating signals and the like of a recording and regenerating device are badly affected because reflectivity is lowered due to solvent attack on the pre-groove.

On the other hand, when a pre-groove is formed by the photo-polymerization process using base polymer, diluent, photo-polymerization initiator and the like, the above mentioned double refraction and solvent resistance problems are removed, but the perservability of a thin film recording layer is poor. Thus, pinholes occur due to degradation by light and heat, and accordingly reflectivity and light absorbency are lowered.

SUMMARY OF THE INVENTION

An object of the present invention is to provide a light-curable composition curable by active ray radiation, which does not have the above mentioned conventional disadvantages and which is excellent in respects of adhesion to a substrate, solvent resistance and releasing properties from a stamper for forming a concavo-convex pattern information track.

Another object of the present invention is to provide an optical information recording medium having an underlayer formed by curing a light-curable composition on a substrate.

That is, an object of the present invention is to provide an optical information recording medium comprising a substrate provided at least with an underlayer and further a recording layer thereon, said underlayer being prepared by curing a light-curable composition containing a reducing agent, a photo-polymerization initiator and acrylate monomer and/or methacrylate monomer and/or their corresponding oligomer.

DETAILED DESCRIPTION OF THE INVENTION

Figure 1:
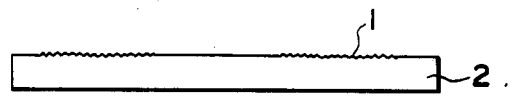
FIGS. 1 to 3 illustrates a process for preparing an optical information recording medium of the present invention.

The optical information recording medium of the present invention is characterized by having an underlayer formed by curing a light-curable composition comprising a reducing agent, a photo-polymerization initiator and acrylate monomer and/or methacrylate monomer and/or their corresponding oligomer coated on a substrate.

The underlayer may be flat or may have a concavo-convex pattern information track thereon. In order to use the optical information recording medium of the present invention for recording and regenerating information, it is necessary to provide a recording layer directly on said flat underlayer or on the concavo-convex pattern pre-groove or pre-format (hereinafter referred to as "concavo-convex pattern information track") formed on the underlayer. The concavo-convex pattern information track is formed by accurately transferring the concavo-convex pattern of a stamper to a substrate. Generally, a high level convex part and a low level concave part are alternatively present, and the height difference between the convex and the concave is regulated in the range of $\lambda/10$ to $\lambda/4$ ($\lambda$=the wavelength of light).

The underlayer of the optical information recording medium of the present invention is formed by curing a light-curable composition by irradiation of an active ray, said light-curable composition comprising a reducing agent, a photo-polymerization initiator and acrylate monomer and/or methacrylate monomer and/or their corresponding oligomer, and, if necessary, further comprising a sensitizer, preservation stabilizer and other compoments.

Typical examples of said monomer include monoacrylate and monomethacrylate, particularly alkyl acrylate, phenyl acrylate, alkoxyalkyl acrylate and phenoxyalkyl acrylate as well as their corresponding methacrylate. More particular suitable examples include ethyl acrylate, n-butyl acrylate, i-butyl acrylate, hexyl acrylate, heptyl acrylate, octyl acrylate, 2-ethylhexyl acrylate, decyl acrylate, dodecyl acrylate, octadecyl acrylate, ethoxyethyl acrylate, phenoxyethyl acrylate, 2-hydroxyethyl acrylate, 2-hydroxypropyl acrylate, 2-hydroxyethylacryloyl phosphate, tetrahydrofurfuryl acrylate, stearyl acrylate, lauryl acrylate, N,N-diethylaminoethyl acrylate, N,N-dimethylaminoethyl acrylate, glycidyl acrylate, benzyl acrylate, cyclohexyl acrylate, dicylopentenyl acrylate and their corresponding methacrylates; diacrylates and dimethacrylates such as 1,3-propanediol diacrylate, 1,3-butanediol diacrylate, 1,6-hexanediol diacrylate, 1,10-decanediol diacrylate, diethyleneglycol diacrylate, triethyleneglycol diacrylate, tetraethyleneglycol diacrylate, tripropyleneglycol diacrylate, polyethyleneglycol diacrylate, neopentylglycol diacrylate, hydroxypivalic acid ester, neopentylglycol diacrylate, trimethylolpropane diacrylate, bisoxyethylenized bisphenol A diacrylate, bisdi(oxyethylenized)bisphenol A diacrylate, bisoxypropylenized bisphenol A diacrylate, bisdi(oxypropylenized)bisphenol A diacrylate, 3-methylpentanediol diacrylate, bisacryloyloxyethyloxymethyl tricyclodecane, and their corresponding dimethacrylates; triacrylates and trimethacrylates such as trimethylolpropane triacrylate, pentaerythritol triacrylate and their corresponding trimethacrylates, and tris(2-hydroxyethyl)isocyanate; acrylates and methacrylates having four or more functional groups such as dipentaerythritol hexa-acrylate, tetramethylolmethane tetra-acrylate and pentaerythritol tetra-acrylate, and their corresponding methacrylates; and the like.

The conventional known photo-polymerization initiators can be used in the present invention, typical examples of which include as follows:

acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bisdiethylaminobenzophenone, Michler's ketone, benzil, benzoin, benzoinmethylether, benzoinethylether, benzoinisopropylether, benzoin-n-propylether, benzoinisobutylether, benzoin-n-butylether, benzylmethylketal, tetramethylthiurammonosulphide, thioxanthone, 2-chlorothioxanthone, 2-methylthioxanthone, azobisisobutylonitrile, benzoinperoxide, di-tert-butylperoxide, p-isopropyl-alpha-hydroxyisobutylphenone, alpha-hydroxyisobutylphenone, dibenzosuberone, diethylthioxanthone, 2,2-dimethoxy-2-phenyl acetophenone and the like.

The photo-polymerization initiator is used in an amount of 0.05 to 10 parts by weight, preferably 0.2 to 5 parts by weight to 100 parts by weight of said monomer.

Examples of a reducing agent used in the present invention include the compounds as listed below:
(a) monohydroxybenzenes,
(b) dihydroxybiphenyls,
(c) polyhydroxybenzenes,
(d) naphthols, naphthyl amines, and aminonaphthols,
(e) hydroxybinaphthyls,
(f) aminophenols,
(g) p-phenylene diamines,
(h) alkylene bisphenols,
(i) ascorbic acid and its derivatives, and
(j) pyrazolidones.

More particular examples of them include as follows:
(a) monohydroxybenzenes:
p-phenylphenol, o-phenylphenol, p-ethylphenol, p-t-butylphenol, p-sec-butylphenol, p-t-aminophenol, p-methoxyphenol, p-ethoxyphenol, p-cresol, 2,6-di-t-butyl-p-cresol, 2,4-xylenol, 2,6-xylenol, 3,4-xylenol, p-acetylphenol, 1,4-dimethoxyphenol, 2,6-dimethoxyphenol, hydroquinonemono-p-hexylether, hydroquinonemonobenzylether, chlorothymol and the like;
(b) dihydroxybiphenyls:
3,3',5,5'-tetra-t-butyl-4,4'-dihydroxybenzene and the like;
(c) polyhydroxybenzenes:
hydroquinone, methylhydroquinone, t-butylhydroquinone, 2,5-dimethylhydroquinone, 2,6-dimethylhydroquinone, t-octylhydroquinone, phenylhydroquinone, methoxyhydroquinone, ethoxyhydroquinone, chlorohydroquinone, bromohydroquinone, hydroquinone monosulfonate, catechol, 3-cyclohexylcatechol, resorcin, gallic acid, methyl gallate, n-propyl gallate and the like;
(d) naphthols, naphthyl amines, and aminonaphthols:
alpha-naphthol, $\beta$-naphthol, 1-hydroxy-4-methoxy naphthalene, 1-hydroxy-4-ethoxy naphthalene, 1,4-dihydroxy naphthalene, 1,5-dihydroxy naphthalene, 1-hydroxy-2-phenyl-4-methoxy naphthalene, 9-hydroxy-2-methyl-4-methoxy naphthalene, potassium 1-amino-2-naphthol-6-sulfonate, 1-hydroxy-4-amino naphthalene, 1-naphthylamino-7-sulfonic acid and the like;
(e) hydroxybinaphthyls:
1,1'-dihydroxy-2,2'-binaphthyl, 4,4'-dimethoxy-1,1'-dihydroxy-2,2'-binaphthyl, 6,6'-dibromo-2,2'-dihydroxy-1,1'-binaphthyl, 6,6'-dinitro-2,2'-dihydroxy-1,1'-binaphthyl, bis(2-hydroxy-1-naphthyl)methane, and the like.
(f) aminophenols:
p-aminophenol, o-aminophenol, 2,4-diaminophenol, N-methyl-p-aminophenol, 2-$\beta$-hydroxyethyl-4-aminophenol, and the like;
(g) p-phenylene diamines:
N,N'-diethyl-p-phenylene diamine, N,N'-dibenzylidene-p-phenylene diamine, and the lile;
(h) alkylene bisphenols:
1,1-bis(2-hydroxy-3-t-butyl-5-methylphenyl)methane, 1,1-bis(2-hydroxy-3,5-dimethylphenyl)-3,5,5-trimethylhexane, 1,1-bis(2-hydroxy-3,5-di-t-butylphenyl)-2-methylpropane, 2,2-bis(4-hydroxy-3-methylphenyl)propane, 4,4-bis(4-hydroxy-3-methylphenyl)heptane, 2,2-bis(4-hydroxy-3-isopropylphenyl)propane, 2,2-bis(4-hydroxy-3-methylphenyl)propane, 1,1-bis(4-hydroxy-3-methylphenyl)cyclohexane, 2,2-bis(4-hydroxy-3,5-dimethylphenyl)propane, 2,2-bis(4-hydroxy-3-t-butyl-5-methylphenyl)propane, 3,3-bis(4-hydroxy-3-t-dodecylphenyl)hexane, (4,4'-dihydroxy-3-methyldiphenyl)-2,2-propane, (4,4'-dihydroxy-3-t-octyldiphenyl)-2,2-propane, (4,4'-dihydroxy-3-t-butyldiphenyl)-4-methyl-2,2-pentane, (4,4'-dihydroxy-3-methyl-3'-t-butyldiphenyl)-2,2-propane, (4,4'-dihydroxy-3-methyl-5-t-butyldiphenyl)-2,2-propane, 2,2-bis(4-hydrodiphenyl)propane, (4,4'-dihydroxy-3,3',5-trimethyldiphenyl)-3,3-pentane, N-(4-hydroxyphenyl)-salicylamide, 2,2-bis(3,5-dibromo-4-hydroxyphenyl)propane, bis(3-methyl-4-hydroxy-5-t-butylphenyl)sulfide, and the like;
(i) ascorbic acid and its derivatives:
1-ascorbic acid, ethyl 1-ascorbate, diethyl 1-ascorbate, and other esters; and
(j) pyrazolidones.
1-phenyl-3-pyrazolidone, 4-methyl-4-hydroxymethyl-1-phenyl-3-pyrazolidone, and the like.

These reducing agents can be used in a mixture of two or more of these compounds. The reducing agent of the present invention is used in an amount of 0.0001–5 parts by weight to 100 parts by weight of said monomer.

Examples of a sensitizer used in the present invention include amine compounds, urea compounds, sulfur compounds, nitryl compounds, phosphorus compounds and nitrogen compounds. The sensitizer is used preferably in an amount of 0.01 to 5 parts by weight to 100 parts by weight of said monomer.

Examples of a preservation stabilizer include quaternary ammonium chloride, diethylhydroxyamine, cyclic amide, nitryl compound, substituted urea, benzothiazole, 4-amino-2,2,6,6-tetramethylpiperidine, bis(1,2,2,6,6-pentamethyl-4-piperidinyl)sebacate, organic acid (such as lactic acid, oxalic acid, citric acid, tartaric acid, benzoic acid and the like), hydroquinone and the like. The preservation stabilizer is used preferably in an amount of 0.0001 to 2 parts by weight to 100 parts by weight of said monomer.

Examples of a substrate used in the present invention include glass plate, plastic plate and the like. Examples of the material for the plastic plate include acrylic resins, methacrylic resins, polystyrene resin, polycarbonate resin, cellulose resin, cellulose triacetate, cellulose acetate butylate, polyethylene terephthalate, and their mixtures or copolymers. Among them, polymethacrylate resin and polycarbonate resin are preferable. It is preferable to provide a pre-coat layer of silane coupling agent and the like or an acryl type hard coat layer to improve the adhesion between the light-curable composition and a substrate.

Examples of a recording layer used in the present invention include a metallic thin film of tellurium, bismuth, antimony, tin, zinc, beryllium, magnesium, germanium, arsenic, lead, selenium and the like or an alloy of these metals or a metallic thin film formed by admixing other elements with these metals; and an organic thin film such as a vapor-deposited film of coloring matter or pigment, a film prepared from a dispersion of coloring matter or pigment in a binder and a film formed by coating a solution of coloring matter. Among them, a thin film of coloring matter having metallic reflective properties is particularly suitable as a recording layer used in the present invention. Examples of the coloring matter having metallic reflective properties include triphenyl methane type coloring matter, xanthene type coloring matter, squarylium type coloring matter, dioxazine type coloring matter, cyanine type coloring matter, merocyanine type coloring matter, and the like. The cyanine type or merocyanine type coloring matters expressed by the following chemical formulas are most useful for the recording layer of the present invention.

Cyanine Coloring Matter:

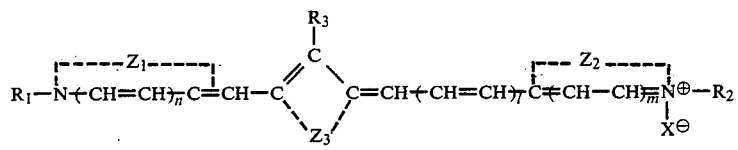

or

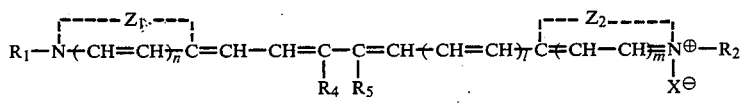

wherein $R_1$ and $R_2$ represent a substituted or non-substituted alkyl group, a substituted or non-substituted aralkyl group or alkenyl group; $Z_1$ and $Z_2$ represent atomic groups necessary for forming a substituted or non-substituted heterocyclic ring; $Z_3$ represents atomic groups necessary for forming a substituted or non-substituted five-membered ring or six-membered ring, said five-membered ring or six-membered ring may be condensed with an aromatic ring; $R_3$ represents hydrogen or halogen atom; $R_4$ and $R_5$ represnet hydrogen, halogen atom, hydroxy group, carboxyl group, alkyl group, substituted or non-substituted aryl group or acyloxy group; $X^-$ represents an acid anion; and l, m and n represent 0 or 1.

Merocyanine Coloring Matter:

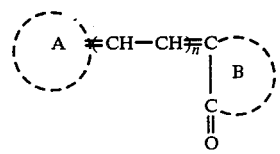

wherein $\widehat{A}$ represents the following rings, the benzene ring and naphthyl ring of which may have a substituent:

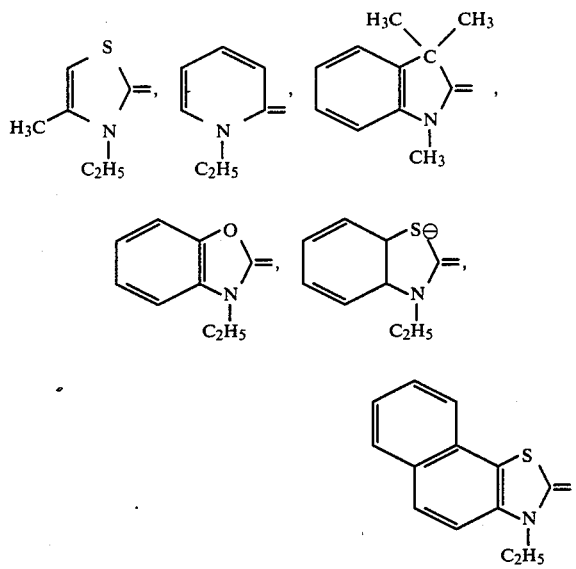

and the like;

represents the following rings;

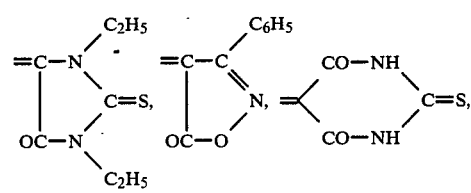

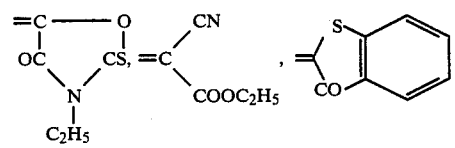

and n represents 1 or 2.

If necessary, the recording layer of the present invention may further contain resin, stabilizer, dispersing agent, fire retardant, lubricant, antistatic agent, surface active agent, plasticizer, and the like. The light stability of a recording layer containing a stabilizer, particularly a triaryl amino compound or a transition metal complex having absorption in the longer wave-length zone is highly improved.

The formation of the recording layer is preferably carried out by coating an underlayer on a substrate with a solution prepared by dissolving a predetermined coloring matter in an appropriate organic solvent such as dichloroethane. The recording layer may be formed by vapor-deposition, sputtering and other techniques.

The thickness of the recording layer is generally 10 to 1000 nm, more preferably 20 to 100 nm, and most preferably 40 to 80 nm.

The thickness of the underlayer is 1 to 200 μm, preferably 10 to 100 μm.

A typical embodiment for forming an underlayer having a concavo-convex pattern information track on a substrate in accordance with the present invention is illustrated by the accompanying drawings.

FIG. 1 shows a stamper 2 having a concavo-convex pattern information track 1 which should be transferred to an underlayer. The material of this stamper is generally nickel, chromium or their alloy, and the surface of the stamper may be subjected to hardening treatment if necessary.

Figure 2:
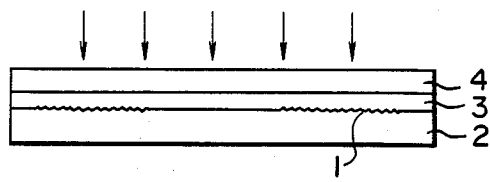

As can be seen from FIG. 2, a light-curable composition 3 is then applied on the stamper 2 and a substrate 4 is superimposed thereon. Thereafter, an active ray is irradiated to cure the light-curable composition 3. Examples of a light source of the active ray include a low pressure mercury lamp, high pressure mercury lamp, ultra-high pressure mercury lamp, xenone lamp, metal halide lamp, carbon arc, ultraviolet ray fluorescent lamp and the like.

Figure 3:
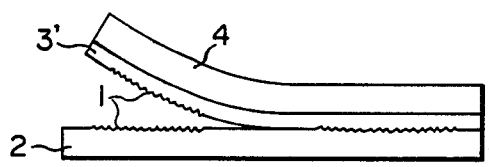

After irradiation by the active ray, the substrate 4 is released from the stamper 2 as illustrated by FIG. 3. The substrate 4 thus treated bears the light-cured layer (underlayer) 3' having the concavo-convex pattern 1 accurately transferred from the stamper 2. This transferring process can be effected only when the light-curable composition of the present invention is used. That is, the bonding strength A between the light-curable composition and the substrate must be larger than the bonding strength B between the light-curable composition and the stamper (i.e. A B). In order to further improve the above mentioned relation of the bonding strength, the substrate may be subjected to surface treatments such as pre-coating (application of pre-coat layer of silane coupling agent or acryl type hard coat layer), corona discharge treatment, flame treatment, ultraviolet treatment, microwave treatment, glow discharge treatment, active plasma irradiation treatment, laser ray irradiation treatment and the like.

DESCRIPTION OF THE PREFERRED EMBODIMENTS

The present invention is further illustrated by the following Examples and Comparative Examples, but is not limited thereto. Amounts of all the components are expressed by parts by weight unless otherwise specified.

EXAMPLE 1

| | |
|---|---|
| 1,6-hexanediol diacrylate | 100 parts |
| diethylthioxanthone | 0.5 part |
| hydroquinone | 0.1 part |

The above components are fully mixed to prepare a light-curable liquid composition. The composition thus prepared was dropped onto a nickel stamper having a concavo-convex information track pattern and a polymethylmethacrylate substrate (a cured film is formed as a hard coat layer on the substrate; "Acrylite AR" by Mitsubishi Rayon Ltd.) was superimposed thereon. Thereafter, ultraviolet ray was irradiated to this laminate for 1 minute by a high pressure mercury lamp of an intensity of 80 W/cm placed at a distance of 25 cm apart from the laminate. The substrate was then released from the nickel stamper, thus the concavo-convex pattern being accurately transferred to the substrate. The power required for releasing was 0.2 kg/cm$^2$, and the bonding strength of the light-cured layer to the substrate was 1.0 kg/cm$^2$. The recording medium thus prepared was dipped in isopropyl alcohol for 15 minutes and the medium was then dried. The transferred concavo-convex pattern did not change and was not damaged at all even after this treatment. The medium was dipped also in 2,2-dichloroethane for 30 seconds and was dried, but the concavo-convex pattern did not change at all.

0.7% 2,2-dichloroethane solution containing cyanine coloring matter having the following chemical formula was spin-coated at 1000 rpm on the concavo-convex pattern, and was dried. The recording medium thus prepared was placed in an oven at 150° C., and the change of the optical density at 790 nm by time was measured.

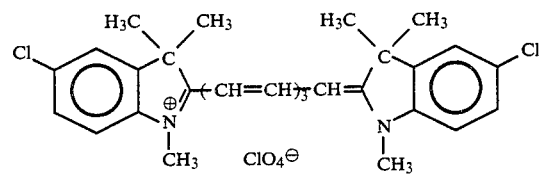

EXAMPLE 2

| | |
|---|---|
| ethyleneglycol diacrylate | 100 parts |
| chlorothioxanthone | 0.5 part |
| isoamyl N—dimethylaminobenzoate | 0.2 part |
| bisphenol A | 0.1 part |

A recording medium was prepared and tested in the same manner as in Example 1, except that the above components were used to prepare a light-curable liquid composition.

EXAMPLE 3

| | |
|---|---|
| 3,8-bisacryloyloxyethyloxymethyl-tricyclo(5-2-10)decane | 100 parts |
| 2,2-dimethoxy-2-phenylacetophenone | 3 parts |
| t-butyl p-cresol | 0.1 part |

A recording medium was prepared and tested in the same manner as in Example 1, except that the above components were used to prepare a light-curable liquid composition.

COMPARATIVE EXAMPLE 1

A recording medium was prepared and tested in the same manner as in Example 1, except that hydroquinone was omitted to prepare a light-curable liquid composition.

COMPARATIVE EXAMPLE 2

A recording medium was prepared and tested in the same manner as in Example 2, except that bisphenol A was omitted to prepare a light curable composition.

COMPARATIVE EXAMPLE 3

A recording medium was prepared and tested in the same manner as in Example 3, except that t-butyl p-cresol was omitted to prepare a light-curable liquid composition.

The test results of the above Examples and Comparative Examples are summarized in the following Table.

TABLE

|  | Bonding[1] Strength (Kg/cm) | Releasing[2] Properties (Kg/cm) | EDC[3] Resistance | Heat Degradation[4] Test |
| --- | --- | --- | --- | --- |
| Example 1 | 1.1 | 0.2 | ○ | 1.0 |
| Example 2 | 1.5 | 0.2 | ○ | 1.5 |
| Example 3 | 0.8 | 0.2 | ○ | 0.8 |
| Comparative Example 1 | 1.1 | 0.19 | ○ | 2.2 |
| Comparative Example 2 | 1.6 | 0.3 | ○ | 2.2 |
| Comparative Example 3 | 0.8 | 0.21 | ○ | 1.5 |

Note:
[1]Bonding strength of light-curved layer to substrate.
[2]Releasing properties of substrate from stamper.
[3]Resistance of light-curved layer to ethylene dichloride (EDC).
[4]relative value obtained by dividing logarithm of change rate of optical density (O.D.) of 790 nm by time.

It is clear from respective comparisons between Example 1 and Comparative Example 1, Example 2 and Comparative Example 2, and Example 3 and Comparative Example 3 that the heat-resistance of the optical information recording medium having an underlayer prepared by using a light-curable composition containing a reducing agent is more improved than those prepared without using a reducing agent.

Generally, the substrate having a concavo-convex pattern formed by using a light curable composition of the present invention can be satisfactorily released from a stamper, thus the transfer of the concavo-convex pattern can be accurately effected. The concavo-convex pattern thus formed also has excellent resistance to solvent, and satisfactorily retains its figure even after forming a coloring matter thin film thereon. Thus, an optical memory disk having a high reflectivity and satisfactory preservability can be provided.

What we claim is:

1. An optical information recording medium comprising a substrate provided at least with an underlayer and a monolayer coloring-matter containing recording layer thereon, said underlayer being prepared by curing a light-curable composition of acrylate monomer and/or methacrylate monomer and/or their corresponding oligomer containing an effective amount to impart heat-resistance of a reducing agent selected from the group consisting of monohydroxybenzenes, polyhydroxybenzenes and alkylenebisphenols, and a photo-polymerization initiator selected from the group consisting of substituted and unsubstituted acetophenones, substituted and unsubstituted benzophenones and substituted and unsubstituted thioxanthones.

2. An optical information recording medium according to claim 1, wherein the photo-polymerization initiator is an acetophenone or thioxanthone.

* * * * *